United States Patent
Wang et al.

(10) Patent No.: US 12,185,366 B2
(45) Date of Patent: Dec. 31, 2024

(54) GENERATION AND DETECTION OF PHYSICAL RANDOM ACCESS CHANNEL (PRACH) PREAMBLE

(71) Applicant: Nokia Technologies Oy, Espoo (FI)

(72) Inventors: Wenjian Wang, Shanghai (CN); Gerhard Schreiber, Korntal-Muenchingen (DE); Pingping Wen, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 305 days.

(21) Appl. No.: 17/798,934

(22) PCT Filed: Feb. 13, 2020

(86) PCT No.: PCT/CN2020/075132
§ 371 (c)(1),
(2) Date: Aug. 11, 2022

(87) PCT Pub. No.: WO2021/159408
PCT Pub. Date: Aug. 19, 2021

(65) Prior Publication Data
US 2023/0083812 A1  Mar. 16, 2023

(51) Int. Cl.
*H04W 74/00* (2009.01)
*H04L 5/00* (2006.01)
*H04W 74/0833* (2024.01)

(52) U.S. Cl.
CPC ......... *H04W 74/002* (2013.01); *H04L 5/0053* (2013.01); *H04W 74/0833* (2013.01)

(58) Field of Classification Search
CPC .......... H04W 74/002; H04W 74/0833; H04W 36/0077; H04W 48/08; H04W 74/0836; H04W 74/08; H04W 72/12; H04L 5/0053
See application file for complete search history.

(56) References Cited

U.S. PATENT DOCUMENTS

| | | | |
|---|---|---|---|
| 10,868,627 B2 | 12/2020 | Han et al. | 11/76 |
| 2006/0153313 A1 | 7/2006 | Lee et al. | |

(Continued)

FOREIGN PATENT DOCUMENTS

| | | |
|---|---|---|
| CN | 1957539 A | 5/2007 |
| CN | 101822115 A | 9/2010 |

(Continued)

OTHER PUBLICATIONS

LG Electronics, "Channel Structure for Two-Step RACH", 3GPP TSG RAN WG1 Meeting #96bis, R1-1904196, Xi'an, China, Apr. 8-12, 2019.

(Continued)

*Primary Examiner* — Mewale A Ambaye
(74) *Attorney, Agent, or Firm* — Robert P. Michal, Esq.; Carter, DeLuca & Farrell LLP

(57) ABSTRACT

Embodiments of the present disclosure relate to generation and detection of physical random access channel (PRACH) preamble. A first device determines a base sequence, a first scrambling sequence for the base sequence, and a second scrambling sequence for the base sequence. The first device generates a random access preamble by applying the first and second scrambling sequences to different portions of the base sequence, respectively. The first device transmits the random access preamble to a second device.

20 Claims, 13 Drawing Sheets

(56) References Cited

U.S. PATENT DOCUMENTS

| | | | |
|---|---|---|---|
| 2017/0359839 A1 | 12/2017 | Wang et al. | |
| 2018/0219663 A1 | 8/2018 | Lin et al. | |
| 2020/0015282 A1 | 1/2020 | Zhao et al. | |
| 2020/0045650 A1* | 2/2020 | Suzuki | H04W 52/36 |
| 2021/0014900 A1* | 1/2021 | Lei | H04W 52/42 |
| 2022/0015089 A1* | 1/2022 | Shin | H04L 1/1819 |
| 2022/0287098 A1* | 9/2022 | Sakhnini | H04L 1/08 |

FOREIGN PATENT DOCUMENTS

| | | | |
|---|---|---|---|
| CN | 101834653 A | | 9/2010 |
| CN | 104393947 A | | 3/2015 |
| CN | 108023736 A | | 5/2018 |
| CN | 108781472 A | | 11/2018 |
| CN | 108811077 A | | 11/2018 |
| CN | 109600334 A | | 4/2019 |
| CN | 110495241 A | | 11/2019 |
| CN | 10741715 | * | 1/2020 |
| CN | 110741715 A | | 1/2020 |
| EP | 3 843 492 A1 | | 6/2021 |
| KR | 20140002156 A | | 1/2014 |
| WO | 2006/052774 A2 | | 5/2006 |
| WO | 2015/005656 A1 | | 1/2015 |
| WO | WO-2018089911 A1 | * | 5/2018 |
| WO | WO-2018151230 A1 | | 8/2018 |
| WO | 2019/061319 A1 | | 4/2019 |
| WO | 2019/195457 A1 | | 10/2019 |
| WO | 2019/213972 A1 | | 11/2019 |
| WO | WO 2020/020278 A1 | | 1/2020 |

OTHER PUBLICATIONS

"3rd Generation Partnership Project; Technical Specification Group Radio Access Network; Solutions for NR to support non terrestrial networks (NTN) (Release 16)", 3GPP TR 38.821, V0.7.0, May 2019, pp. 1-86.

"Study on NR to support Non-Terrestrial Networks", 3GPP TSG RAN WG1 Meeting 88bis, RP-171450, Agenda: 9.1, Thales, Jun. 5-9, 2017, 5 pages.

"Study on solutions evaluation for NR to support Non Terrestrial Network", 3GPP TSG RAN meeting #80, RP-181370, Agenda: 9.1.17, Thales, Jun. 11-14, 2018, 5 pages.

"3rd Generation Partnership Project; Technical Specification Group Radio Access Network; Study on New Radio (NR) to support non-terrestrial networks (Release 15)", 3GPP TR 38.811, V15.2.0, Sep. 2019, pp. 1-126.

"On NTN synchronization, random access, and timing advance", 3GPP TSG-RAN WG1 Meeting #99, R1-1912725, Agenda: 7.2.5.3, Ericsson, Nov. 18-22, 2019, pp. 1-22.

Shinakov, "Ambiguity Functions of Zadoff-Chu Signals for 5-G Synchronization Systems", Systems of Signal Synchronization, Generating and Processing in Telecommunications (SYNCHROINFO), Jul. 4-5, 2018, 7 pages.

"Discussion on the TA and PRACH for NTN", 3GPP TSG RAN WG1 #99, R1-1912612, Agenda: 7.2.5.3, ZTE, Nov. 18-22, 2019, pp. 1-12.

"RACH Procedure and UL Timing Control for NTN", 3GPP TSG RAN WG1 #99, R1-1912956, Agenda: 7.2.5.3, Qualcomm Incorporated, Nov. 18-22, 2019, pp. 1-10.

"Timing advance and PRACH design for NTN", 3GPP TSG RAN WG1 #99, R1-1912903, Agenda: 7.2.5.3, Panasonic, Nov. 18-22, 2019, pp. 1-13.

"PRACH design for NTN scenario", 3GPP TSG-RAN WG1 #99 Meeting, R1-1912124, Agenda: 7.2.5.3, MediaTek Inc, Nov. 18-24, 2019, 14 pages.

"PRACH design and UL timing management", 3GPP TSG-RAN WG1 #99 Meeting, R1-1912165, Agenda: 7.2.5.3, CATT, Nov. 18-22, 2019, 5 pages.

Minn et al., "A robust timing and frequency synchronization for OFDM systems", IEEE Transactions on Wireless Communications, vol. 2, No. 4, Jul. 2003, pp. 822-839.

"IEEE 802.11", Wikipedia, Retrieved on Aug. 8, 2024, Webpage available at : https://en.wikipedia.org/wiki/IEEE_802.11.

Office Action received for corresponding Chinese Patent Application No. 202080096556.9, dated May 29, 2024, 13 pages of Office Action and no page of translation available.

Wang et al., "A Novel Time Synchronization Scheme for OFDM Systems Based on Variational Pseudo-Noise Preamble", 10th Asia-Pacific Symposium on Information and Telecommunication Technologies (APSITT), Aug. 4-7, 2015, pp. 4-6.

"PRACH scrambling code handling for Further Enhanced CELL_FACH", 3GPP TSG-RAN WG 3GPPRAN2 #79bis, R2-124506, Agenda: 10.1.6, Ericsson, Oct. 8-12, 2012, pp. 1-3.

"On Initial Access and RACH Procedures for NTN", 3GPP TSG RAN WG1 Meeting #96bis, R1-1904858, Agenda: 7.2.5.3, Interdigital Inc, Apr. 8-12, 2019, pp. 1-5.

* cited by examiner

GENERATION AND DETECTION OF PHYSICAL RANDOM ACCESS CHANNEL (PRACH) PREAMBLE

CROSS REFERENCE TO RELATED APPLICATION

This patent application is a U.S. National Stage application of International Patent Application Number PCT/CN2020/075132 filed Feb. 13, 2021, which is hereby incorporated by reference in its entirety.

FIELD

Embodiments of the present disclosure generally relate to the field of communication, especially in non-terrestrial network and in particular, to devices, methods, apparatuses and computer readable storage media for generating and detecting physical random access channel (PRACH) preamble.

BACKGROUND

Since resources and infrastructure are limited in remote area, it is very difficult for terrestrial network to provide fifth generation (5G) coverage. For this reason, non-terrestrial network (NTN) is introduced. In the NTN, satellites and high altitude platform stations (HAPS) are used to provide connectivity across a wide service area. The main benefits of introducing NTN are to enable ubiquitous 5G services to terminal devices (for example, user equipment, UE) by extending connectivity in less densely populated areas with extremely low density of devices. Moreover, the overall cost of NTN deployment may be much less than providing permanent infra-structure on the ground. A new solution for new radio (NR) to support NTN has been proposed. However, some issues regarding NTN remain pending.

SUMMARY

In general, example embodiments of the present disclosure provide a solution for generating and detecting PRACH preamble.

In a first aspect, there is provided a first device. The first device comprises at least one processor; and at least one memory including computer program codes; the at least one memory and the computer program codes are configured to, with the at least one processor, cause the first device to determine a base sequence, a first scrambling sequence for the base sequence, and a second scrambling sequence for the base sequence; generate a random access preamble by applying the first and second scrambling sequences to different portions of the base sequence, respectively; and transmit the random access preamble to a second device.

In a second aspect, there is provided a second device. The second device comprises at least one processor; and at least one memory including computer program codes; the at least one memory and the computer program codes are configured to, with the at least one processor, cause the second device to determine a first scrambling sequence for a base sequence and a second scrambling sequence for the base sequence; determine, based on the first and second scrambling sequences, a timing metric for estimating timing offset; and receive, based on the timing metric, a random access preamble from a first device, the random access preamble generated by applying the first and second scrambling sequences to different portions of the base sequence, respectively.

In a third aspect, there is provided a method. The method comprises: determining, at a first device, a base sequence, a first scrambling sequence for the base sequence, and a second scrambling sequence for the base sequence; generating a random access preamble by applying the first and second scrambling sequences to different portions of the base sequence, respectively; and transmitting the random access preamble to a second device.

In a fourth aspect, there is provided a method. The method comprises: determining, at a second device, a first scrambling sequence for a base sequence and a second scrambling sequence for the base sequence; determining, based on the first and second scrambling sequences, a timing metric for estimating timing offset; and receiving, based on the timing metric, a random access preamble from a first device, the random access preamble generated by applying the first and second scrambling sequences to different portions of the base sequence, respectively.

In a fifth aspect, there is provided an apparatus. The apparatus comprises means for determining, at a first device, a base sequence, a first scrambling sequence for the base sequence, and a second scrambling sequence for the base sequence; means for generating a random access preamble by applying the first and second scrambling sequences to different portions of the base sequence, respectively; and means for transmitting the random access preamble to a second device.

In a sixth aspect, there is provided an apparatus. The apparatus comprises means for determining, at a second device, a first scrambling sequence for a base sequence and a second scrambling sequence for the base sequence; means for determining, based on the first and second scrambling sequences, a timing metric for estimating timing offset; and means for receiving, based on the timing metric, a random access preamble from a first device, the random access preamble generated by applying the first and second scrambling sequences to different portions of the base sequence, respectively.

In a seventh aspect, there is provided a non-transitory computer readable medium comprising program instructions for causing an apparatus to perform at least the method according to the third aspect.

In an eighth aspect, there is provided a non-transitory computer readable medium comprising program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
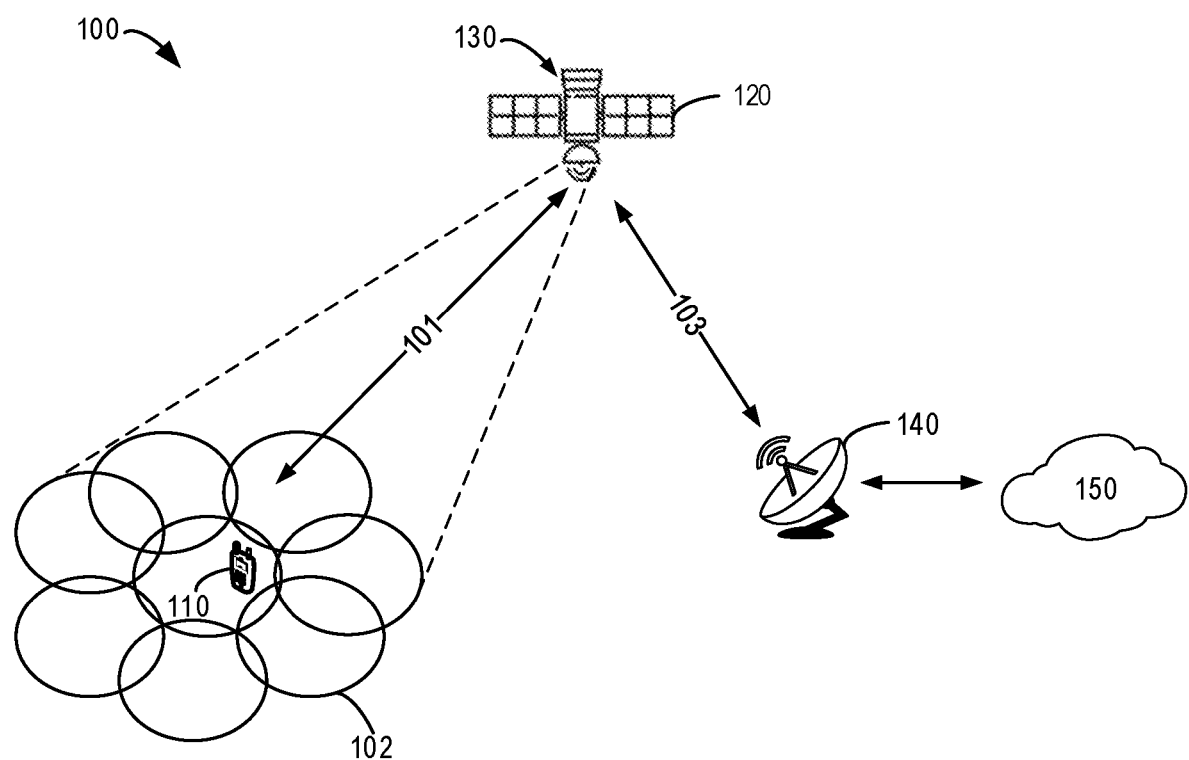
FIG. 1 illustrates an example communication system in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), 5G New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the 5G communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, an Integrated Access Backhaul (IAB) node, a NTN or non-ground network device such as a satellite network device, a low earth orbit (LEO) satellite, medium earth orbit (MEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 illustrates an example communication system 100 in which example embodiments of the present disclosure may be implemented. An example NTN network is shown in FIG. 1. The communication system 100 includes a first device 110 and a second device 120 that can communicate with each other. In this example, the first device 110 is illustrated as a terminal device (specifically, an UE), and the second device 120 is illustrated as a NTN network device serving the terminal device.

In some NTN scenarios, the network device (e.g., gNB) will be on earth communicating with a transparent satellite, while in some other NTN scenarios, the network device will be onboard with a regenerative satellite. In the example of FIG. 1, the second device 120 is deployed at a space/airborne platform, for example a satellite 130, which corresponds to a regenerative satellite. It is to be understood that the second device 120 may also be deployed on earth and communicate with a transparent satellite. Moreover, other aerial vehicles may be used as the space/airborne platform.

The satellite 130 or aerial vehicles typically generate several beams over a given area. The foot prints of the beams, for example the beam foot print 102, are typically elliptic shape. A service link 101 refers to the radio link between the first device 110 and the satellite 130. In addition, although not shown, the first device 110 may also support a radio link with terrestrial based radio access network (RAN). A feeder link 103 refers to the radio link between the gateway 140 and the satellite 130. The gateway 140 is connected to a data network, for example the core network.

It is to be understood that the number of devices (both the first device and the second device) is only for the purpose of illustration without suggesting any limitations. The system 100 may include any suitable number of devices adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Cyclic Prefix Orthogonal Frequency Division Multiplexing (CP-OFDM), Discrete Fourier Transform spread OFDM (DFT-s-OFDM) and/or any other technologies currently known or to be developed in the future.

In the communication system 100, upon a connection is established, the first device 110 and the second device 120 can communicate data and control information to each other. In the case where the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Typically, in order to communicate with each other, for example, the first device 110 may initiate a random access (RA) procedure to establish or re-establish a connection with the second device 120. During the RA procedure, the first device 110 may transmit a random access preamble (which may also be referred to as PRACH preamble) to the second device 120.

As mentioned above, some issues regarding NTN remain pending. Depending on the deployment scenario, the long distance separation between the network device on the NTN platform and the terminal device on earth surface results in large beam foot prints which would bring about some problems. For example, the differential delay exceeds the maximum cell coverage supported by the NR preamble format. Besides the delay, the high frequency offset caused by Doppler shifts and local oscillator is a big challenge for the existing NR PRACH preamble formats. Therefore, new PRACH preamble sequence design that is robust to frequency offset and time delay is significant important for NTN.

Several agreements are achieved on DL synchronization, UL frequency compensation, timing advance (TA) adjustment and PRACH format and/or sequence. For example, if pre-compensation of timing and frequency offset is assumed (e.g., if UE knowledge of geo-location of the UE at the requisite level of accuracy is available), existing PRACH formats and preamble sequences can be reused in NTN. If pre-compensation of timing and frequency offset is not performed, introduction of enhanced PRACH formats and/or preamble sequences is beneficial.

The existing PRACH preamble utilizes Zadoff-Chu (ZC) sequences and comprises a cyclic prefix (CP), multiple repetitions of PRACH sequence and guard period (GP). The formats have been designed to facilitate UL timing estimation, with the assumption that the UL frequency offset between the terminal device and the network device is small after DL synchronization. The assumption of small UL frequency offset between the terminal device and the network device in Message 1 (Msg 1) of the RA procedure is valid in a terrestrial network, where the network device is stationary and the frequency offset is mainly determined by the terminal device's DL movement.

Currently, there are two types of PRACH preamble format in NR, which are long preambles with length $L_{RA}=839$ and short preambles with length $L_{RA}=139$ as shown in Table 1-1 and Table 1-2.

TABLE 1-1

Preamble formats for $L_{RA}$ = 839 and $\Delta f^{RA} \in \{1.25, 5\}$ kHz

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

TABLE 1-2

Preamble formats for $L_{RA}$ = 139 and $\Delta f^{RA} = 15 \cdot 2^\mu$ kHz where $\mu \in \{0, 1, 2, 3\}$

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^\mu$ kHz | $2 \cdot 2048\kappa \cdot 2^{-\mu}$ | $288\kappa \cdot 2^{-\mu}$ | — |
| A2 | 139 | $15 \cdot 2^\mu$ kHz | $4 \cdot 2048\kappa \cdot 2^{-\mu}$ | $576\kappa \cdot 2^{-\mu}$ | — |
| A3 | 139 | $15 \cdot 2^\mu$ kHz | $6 \cdot 2048\kappa \cdot 2^{-\mu}$ | $864\kappa \cdot 2^{-\mu}$ | — |
| B1 | 139 | $15 \cdot 2^\mu$ kHz | $2 \cdot 2048\kappa \cdot 2^{-\mu}$ | $216\kappa \cdot 2^{-\mu}$ | — |
| B2 | 139 | $15 \cdot 2^\mu$ kHz | $4 \cdot 2048\kappa \cdot 2^{-\mu}$ | $360\kappa \cdot 2^{-\mu}$ | — |
| B3 | 139 | $15 \cdot 2^\mu$ kHz | $6 \cdot 2048\kappa \cdot 2^{-\mu}$ | $504\kappa \cdot 2^{-\mu}$ | — |
| B4 | 139 | $15 \cdot 2^\mu$ kHz | $12 \cdot 2048\kappa \cdot 2^{-\mu}$ | $936\kappa \cdot 2^{-\mu}$ | — |
| C0 | 139 | $15 \cdot 2^\mu$ kHz | $2048\kappa \cdot 2^{-\mu}$ | $1240\kappa \cdot 2^{-\mu}$ | — |
| C2 | 139 | $15 \cdot 2^\mu$ kHz | $4 \cdot 2048\kappa \cdot 2^{-\mu}$ | $2048\kappa \cdot 2^{-\mu}$ | — |

TABLE 1-3

Preamble parameters in different formats

| Format | $L_{RA}$ | $\Delta f^{RA}$ (KHz) | Repetitions | CP length (us) | Preamble length (without CP)(us) |
|---|---|---|---|---|---|
| 0 | 839 | 1.25 | 1 | 103.12 | 800 |
| 1 | 839 | 1.25 | 2 | 684.37 | 1600 |
| 2 | 839 | 1.25 | 4 | 152.60 | 3200 |
| 3 | 839 | 5 | 4 | 103.12 | 800 |
| A1 | 139 | 15 | 2 | 9.37 | 133.33 |
| A2 | 139 | 15 | 4 | 18.75 | 266.67 |
| A3 | 139 | 15 | 6 | 28.12 | 400 |
| B1 | 139 | 15 | 2 | 7.03 | 133.33 |
| B2 | 139 | 15 | 4 | 11.71 | 266.67 |
| B3 | 139 | 15 | 6 | 16.41 | 400 |
| B4 | 139 | 15 | 12 | 30.47 | 800 |
| C0 | 139 | 15 | 1 | 40.36 | 66.67 |
| C2 | 139 | 15 | 4 | 66.67 | 266.67 |

In view of the above, the current NR preamble formats may not be sufficient for all NTN scenarios. New PRACH design is needed to resist maximal delay and maximal frequency offset. At least for the case without pre-compensation of timing and frequency offset, at least the following options for enhanced PRACH formats and/or preamble sequences can be considered: Option-1, a single Zadoff-Chu sequence based on larger SCS, repetition number; Option-2, a solution based on multiple Zadoff-Chu sequences with different roots; Option-3, Gold/m-sequence as preamble sequence with additional process, e.g., modulation and transform pre-coding; Option-4, a single Zadoff-Chu sequence with combination of scrambling sequence. However, no details about these options have been proposed.

The current PRACH preamble format/parameters are not well suited for NTN since there are several peaks in the ambiguity function of ZC sequences in the Delay-Doppler plane, leading to many timing and Doppler ambiguities. As a result, the new Primary Synchronization Signal (PSS) sequence design has been discussed in NR, for example, M-sequence. For PRACH of NTN, the situation is more In NTN, the assumption of small UL frequency offset between the terminal device and the network device in Msg1 is no longer valid due to the fast movement of a LEO satellite that results in high Doppler shift. It could be seen from Table 1-3 that the CP length is no more than 684.37 us while the max differential delay within a beam is 1.6 ms in GEO and 0.65 ms in LEO, which is much larger than 684.37 us or approximating this value.

difficult, as it is needed to design a set of orthogonal sequences, in order to distinguish between different terminal devices transmitting simultaneously and having a higher time/frequency uncertainty with respect to the terrestrial scenario. Furthermore, if cyclic shifted ZC sequences are used, the composite shift caused by time/frequency ambiguity may make one sequence becoming another sequence, leading to misdetection at the receiver.

Because of this inner weakness of ZC sequences, some solutions have been proposed, which includes simply modifying some parameters (e.g., CP size, subcarrier spacing) or repeating the sequence. However, these solutions seldom analyze the problem from the sequence itself and thus do not show robust performance. In the present disclosure, the new PRACH sequence design to adapt to the NTN system and the corresponding detection scheme at the receiver are provided.

To design a suitable PRACH preamble format for both UL timing estimation and UL frequency estimation, it is imperative to first understand why the existing NR PRACH preamble formats based on ZC sequences cannot meet the target. It is well known that the correlation peak of ZC sequence is shifted under frequency offset. The shifting amount is as a function of the root index and frequency offset. The correlation peak generally represents the start timing of the received signal. Therefore, what should be considered first is the sequence design to have robust symbol timing under large frequency shift in NTN.

The aim of symbol timing is to obtain a starting point of Fast Fourier Transform (FFT) window so that the transmitted data (which is the random access preamble in this case) can be demodulated correctly at the receiver. Otherwise, it will result in inter-symbol interference (ISI) and inter-channel interference (ICI), leading to a poor detection performance.

The existing preamble utilizes more than two OFDM symbols to realize timing synchronization. For example, the long sequence in Format 1 as shown in Table 1-1, and the short sequences in Format A1 and B1 have the repetitious form of two identical sequences. However, there exists a plateau of the metric function with the length of $N_{cp}$ samples. To solve the problem, the preamble is separated from two of the same data blocks into four of the same data blocks, such as the long sequence in Format 2 as shown in Table 1-1, the short sequences in Format A2 and B2. However, the declining curve is not steep enough, which also causes timing estimation inaccuracy. Conjugate symmetry preamble is proposed, and can effectively solve the problem of the steepness of the declining curve. However, there exists side lobe outside the main lobe.

Moreover, based on the agreements mentioned above, more details for enhancement to PRACH are provided. For example, with respect to Option-2, two alternatives, e.g., a single PRACH preamble consisting of two-root sequence or multiple preambles transmission from single terminal device with different roots, are proposed. And, the details on how to determine the root pairs, e.g., complex conjugated or additional rule, are also provided.

In the present disclosure, a new PRACH preamble and corresponding detection scheme are provided. At the transmitting device, for example at the terminal device, the new PRACH preamble is based on a base sequence and at least two scrambling sequences. The at least two scrambling sequences, which may have a property of pseudo randomness, are applied to the base sequence to generate the new PRACH preamble. For example, the scrambling sequences may be used as weighted factors for the base sequence. The base sequence may comprise multiple root sequences (e.g., ZC sequences) with the same or inverted sign. At the receiving device, for example at the network device, a timing metric based on the at least two scrambling sequences is used for symbol timing to receive the new PRACH preamble.

By means of the proposed PRACH preamble and detection scheme, the problem of large frequency offset and differential delay between the transmitting and receiving devices can be overcome and timing precision can be improved. In this way, an accurate estimation of timing offset can be achieved to facilitate UL timing estimation particularly in the presence of large UL frequency offset between the transmitting and receiving devices.

Some example embodiments of the present disclosure will be described in detail below. To better understand the principle of the present disclosure, description is first made to preamble design and detection scheme design by way of example.

System Description

The expressions for a transmitted signal and s received signal are based on general OFDM signal model for PRACH. At the transmitting device, the time-discrete OFDM like PRACH signal, can be expressed as:

$$x(n) = \frac{1}{\sqrt{N}} \sum_{k=0}^{N_{ZC}-1} a(k)e^{j2\pi kn/N} \quad (1)$$

$$n \in \{0, 1, \ldots, N-1\}$$

where a(k) denotes the modulated data (which is the random access preamble in this case) or subcarrier symbol over the k-th subcarrier. After serial/parallel (S/P) conversion, the duration of transmission time is extended to $T=MT_x$, with M being the number of repetition symbols and $T_s$ being the temporal length of one symbol $T_s=1/\Delta f^{RA}$. N is the window size of IFFT ($N_{ZC} \leq N$). A cyclic prefix with the length of $N_{CP}$ is placed in front of the first symbol.

At the receiving device, the received signal can be express as:

$$y(n) = e^{\frac{j2\pi n\varepsilon}{N}} \sum_{l=0}^{L-1} h_l x(n - \theta_l) + \omega(n) \quad (2)$$

$$n \in \{0, 1, \ldots, M \cdot N + N_{CP} - 1\}$$

where $h_l$ is the channel impulse response for tap l. The integer normalized symbol timing offset $\theta_l$ and the normalized carrier frequency offset $\varepsilon$ are modeled as a delayed signal at the receiving device and a phase offset in time domain respectively, $\omega(n)$ is complex Gaussian noise process with zero-mean and the variance of $\sigma_n^2$.

Preamble Design

An additional preamble format may be introduced to the existing preamble formats as shown in Table 1-1 and Table 1-2. An additional format, which is referred to as Format 4, is given as an example herein. The example Format 4 as shown in Table 2 is based on the existing long preamble format with proper scaling factor μ.

TABLE 2

Example preamble format

| Format | $L_{RA}$ | $\Delta f^{RA}$ | $N_u$ | $N_{CP}^{RA}$ | Support for restricted sets |
|---|---|---|---|---|---|
| 4 | 839 | $1.25 \cdot 2^\mu$ kHz | $4 \cdot 32768\kappa \cdot 2^{-\mu}$ with two scrambling sequences | $21024\kappa \cdot 2^{-\mu}$ | Type A, Type B | where $\mu \in \{0,4\}$ for a first frequency range (e.g. FR1); $\mu \in \{5,6,7\}$ for a second frequency range (e.g. FR2).

The Format 4 corresponds to a preamble length of 839 in frequency domain and 4 repetitions in time domain. Similar additional preamble format may be introduced. For example, another additional preamble may be based on the existing short preamble format with 6 repetitions in time domain for example.

The principle of proposed approach is to utilize two scrambling sequences as weighted factor to ensure that the value of the timing metric function (detailed below) reaches its maximum at correct timing position. Different portions of the random access preamble may be weighted with different scrambling factors. For example, the first and second halves of the preamble are weighted with first and second scrambling sequences, respectively.

The scrambling sequences may have a property of pseudo randomness. The scrambling sequences may share similar statistical characteristics with random signals but can be deterministically generated and processed.

The Pseudo Noise (PN) sequences are similar to random noises, which share similar statistical characteristics. However, unlike real random signals, the PN sequences can be deterministically generated and processed. PN sequences can be used in spreading spectrum communication systems and secret communication systems. The autocorrelation of PN sequence is a two-valued function with specialty of a sharp autocorrelation peak when there is no shift. Although the cross correlation properties of the PN sequence have not been described perfectly yet, the cross correlation properties of the same order m-sequence (as a typical type of PN sequence) can be considered as correlation function between a m-sequence and its sampling sequence, and the calculation of correlation function is only related to the selection of sampling factor.

In view of the above characteristics of PN sequences, in an example embodiment, two PN sequences may be used as the scrambling sequences. The two PN sequences may be two different PN sequences with the same period. By using the PN sequences as the scrambling sequences, the error rate can be reduced compared to the existing methods, burst wide range deviation can be avoided and the difference of the timing metric value around the correct starting point can be further enlarged.

An example with two PN sequences G and Q will be described. The two PN sequences G and Q and Binary Phase Shift Keying (BPSK) (±1) transformed sequences can be defined as:

$$G(i), i \in \left\{0, 1, \ldots, \frac{N_u}{2} - 1\right\} \quad (3)$$

$$Q(i), i \in \left\{0, 1, \ldots, \frac{N_u}{2} - 1\right\}$$

As shown in equation (3), each of the PN sequences has a length of $N_u/2$. In the case where the Format 4 is used, $N_u$ takes the value as shown in Table 2. For example, if it is assumed that K=1, $\mu$=4, then $4*32768*2^{(-4)}/2=4096$, and the required PN sequence order is 12.

The PN sequences may be generated using a shift register. For example, the PN sequences G and Q may be generated based on a primitive polynomial. Take the primitive polynomial "fbconnection=[1 0 0 0 1 1]"(x^6+x+1) for example.

"fbconnection=[1 0 0 0 1 1];% x^6+x+1
mseq=m_sequence(fbconnection);
PN1=mseq*2−1;z=[mseq(end) mseq(1:end−1)];
PN2=mod(mseq+z,2)*2−1;
Here, mseq could be defined as:
"function[mseq]=m_sequence(fbconnection);
n=length(fbconnection);
N=2^n−1;
register=[zeros(1,n−1) 1];% The initial state of shift register
mseq(1)=register(n);
for i=2:N
newregister(1)=mod(sum(fbconnection.*register),2);
for j=2:n,
newregister(j)=register(j−1);
end;
register=newregister;
mseq(i)=register(n);
end"

It is to be understood that the above example of generation of m-sequence is only for purpose of illustration without any limitation. The PN sequence may be generated based on other polynomial and other scheme for PN sequence generation may be used.

Now description is given to the base sequence. Take the case where the base sequence is based on a ZC sequence as an example. A ZC sequence of length $N_{ZC}$ is defined as:

$$X_u(k) = e^{-j\frac{2\pi u k(k+1)}{N_{ZC}}}, 0 \le k \le N_{ZC} - 1 \quad (4)$$

where u denotes the root sequence index. The root sequence index is an integer in the range of $1 \le u \le N_{ZC}-1$ and is co-prime to the sequence length $N_{ZC}$.

The AC sequence as defined by the equation (4) is in frequency domain. A root sequence based on the ZC sequence can be defined as:

$$x_u = \text{IFFT}(\text{FFT}(X_u)) \quad (5)$$

where the size of FFT is $N_{ZC}$ and the size of IFFT is $N_u/4$. In this example, the length of the root sequence is a half of the length of the scrambling sequence, for example the PN sequences as defined by equation (3).

Figure 2A:
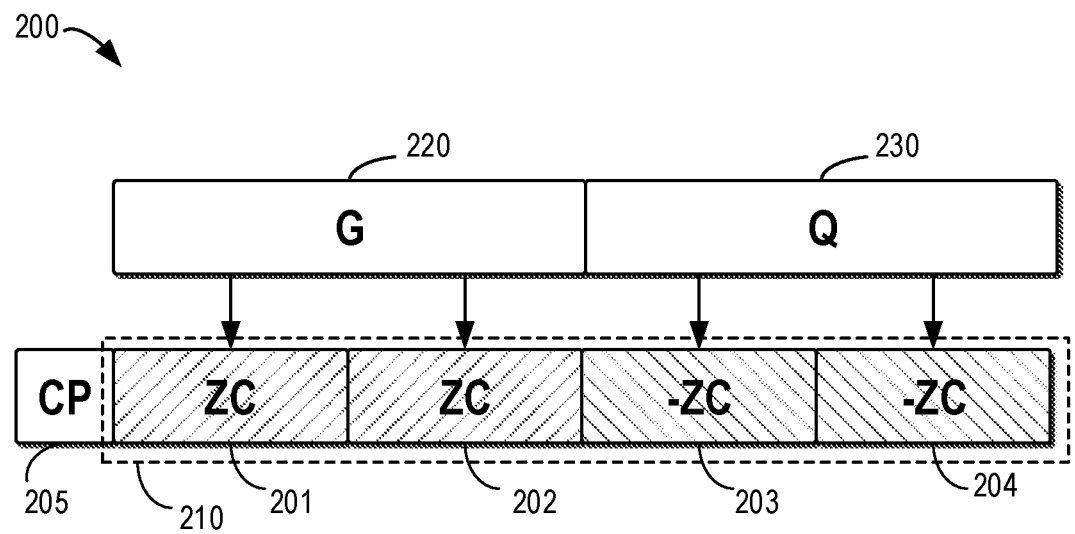
FIG. 2A illustrates a schematic diagram showing an example preamble according to some example embodiments of the present disclosure.
Figure 2B:
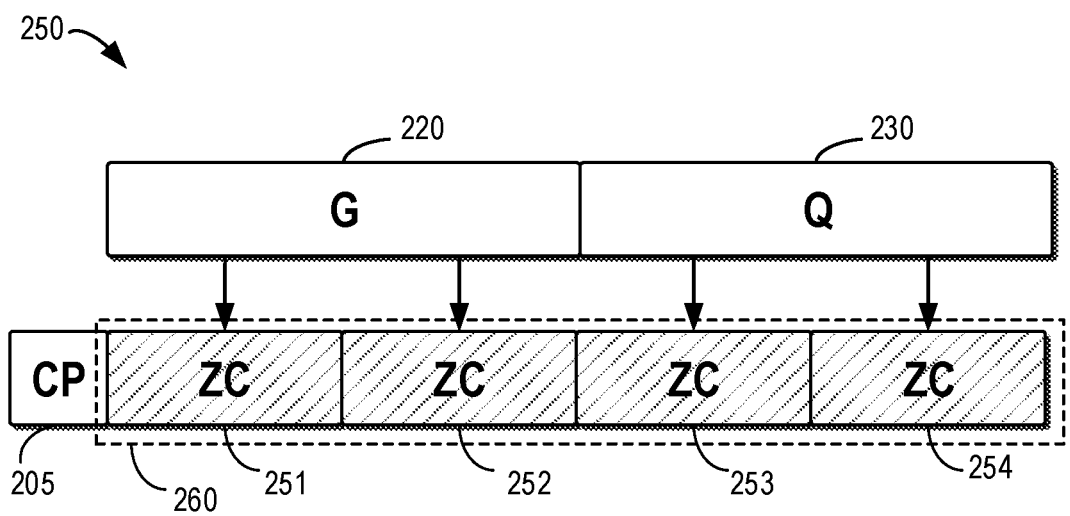
FIG. 2B illustrates a schematic diagram showing another example preamble according to some example embodiments of the present disclosure.

Reference now is made to FIGS. 2A and 2B to illustrate the structure of the base sequence. In examples of FIGS. 2A and 2B, the base sequence is shown to be based on ZC sequence and the scrambling sequences are shown as PN sequences for purpose of illustration.

The base sequence may comprise multiple repetitions of a root sequence with the inverted sign. FIG. 2A illustrates a schematic diagram 200 showing an example preamble according to some example embodiments of the present disclosure. The base sequence 210 comprises a first portion including two repetitions 201, 202 of the ZC sequence and a second portion including two repetitions 203, 204 of the ZC sequence. The two repetitions 203, 204 of the ZC sequence have an inverted sign as compared to the two repetitions 201, 202 of the ZC sequence. A repetition of a root sequence may be also referred to as a block herein.

The base sequence 210 in the example of FIG. 2A has a structure of discrete-time four concatenated ZC sequences. Such a base sequence can be defined as:

$$ZC\left(i + 0 \cdot \frac{N_u}{4}\right) = x_u(i) \quad (6)$$

$$ZC\left(i + 1 \cdot \frac{N_u}{4}\right) = x_u(i)$$

$$ZC\left(i + 2 \cdot \frac{N_u}{4}\right) = -x_u(i)$$

$$ZC\left(i + 3 \cdot \frac{N_u}{4}\right) = -x_u(i)$$

$$i \in \left\{0, 1, \ldots, \frac{N_u}{4} - 1\right\}$$

where $x_u(i)$ is defined by the equation (5). In the case where the Format 4 is used, $N_u$ takes the value as shown in Table 2.

Alternatively, the base sequence may comprise multiple repetitions of a root sequence with the same sign. FIG. 2B illustrates a schematic diagram 250 showing another example preamble according to some example embodiments of the present disclosure. The base sequence 260 comprises four repetitions 251, 252, 253, 254 of the ZC sequence, which have the same sign.

The base sequence 260 in the example of FIG. 2B has a structure of discrete-time four concatenated ZC sequences. Such a base sequence can be defined as:

$$ZC\left(i + 0 \cdot \frac{N_u}{4}\right) = x_u(i) \quad (7)$$

$$ZC\left(i + 1 \cdot \frac{N_u}{4}\right) = x_u(i)$$

$$ZC\left(i + 2 \cdot \frac{N_u}{4}\right) = x_u(i)$$

$$ZC\left(i + 3 \cdot \frac{N_u}{4}\right) = x_u(i)$$

$$i \in \left\{0, 1, \ldots, \frac{N_u}{4} - 1\right\}$$

where $x_u(i)$ is defined by the equation (5). In the case where the Format 4 is used, $N_u$ takes the value as shown in Table 2. In other words, such as base sequence is determined as simple repetitions of the root sequence.

The random access preamble can be generated by applying the two scrambling sequences to the base sequence, for example to different portions of the base sequence. As an example, the scrambling sequences may be used as a weighted factor for the base sequence. As such, for the above examples, the random access preamble can be defined as the following equation (6):

$$\widetilde{ZC}(i) = \begin{cases} ZC(i) \cdot G(i), & i \in \left\{0, 1, \ldots, \frac{N_u}{2} - 1\right\} \\ ZC(i) \cdot Q\left(i - \frac{N_u}{2}\right), & i \in \left\{N_u/2, N_u/2 + 1, \ldots, N_u - 1\right\} \end{cases} \quad (8)$$

where ZC(i) is defined by equation (6) or (7), G(i) and $$Q\left(i - \frac{N_u}{2}\right)$$

are defined by equation (3).

Still referring to FIGS. 2A and 2B, the example preamble shown in FIG. 2A is generated by applying the PN sequence G 220 to the first two repetitions 201, 202 of the ZC sequence and applying the PN sequence Q 230 to the last two repetitions 203, 204 of the ZC sequence. The random access preamble in this format exploits four ZC blocks with inverted signs of the latter two blocks and the correlation characteristics of PN sequences to estimate the PRACH timing offset. The first half of the base sequence 210 can be generated in the same way as traditional ZC sequence generation and repeat these samples with sign conversion to form the latter half of the base sequence 210. Then, the two PN sequences G and Q are applied to the first half and the latter half of the base sequence 210 as weighted factors, respectively, to generate the random access preamble, which is to be transmitted.

Similarly, the example preamble shown in FIG. 2B is generated by applying the PN sequence G 220 to the first two repetitions 251, 252 of the ZC sequence and applying the PN sequence Q 230 to the last two repetitions 253, 254 of the ZC sequence. Each of the example preambles as shown in FIGS. 2A and 2B further comprises a CP 205. In the case where Format 4 is applicable, the length of the CP 205 is determined by the parameter $N_{CP}^{RA}$ as shown in Table 2.

Detection Scheme Design

At the receiving device, for example at the network device, a timing metric is required to determine the starting position of the useful part of the PRACH preamble, which may be referred to as PRACH symbol timing. Therefore, a detection scheme corresponding to the proposed preamble design is also provided in the present disclosure.

It is to be noted that the PN sequence is employed to diminish the two adjacent values of the timing metric because it is shown that they share the same sum of the pairs of product, with the exception of two product terms. Therefore, to enlarge the difference between the two adjacent values of the timing metric and avoid sudden timing shift and non-robust under low SNR, it is necessary to maximize the different pairs of product between them.

As an example, the timing metric used at the receiving device may be given by:

$$M_{proposed}(d) = \frac{|P_{proposed}(d)|^2}{(R_{proposed}(d))^2} \quad (9)$$

$$P_{proposed}(d) = \sum_{i=0}^{\frac{N_u}{4}-1} \left( G_i G_{i+\frac{N_u}{4}} \cdot y^*(d+1) \cdot y\left(d+i+\frac{N_u}{4}\right) + Q_i Q_{i+\frac{N_u}{4}} \cdot y^*\left(d+i+\frac{N_u}{2}\right) \cdot y\left(d+i+\frac{N_u}{4}+\frac{N_u}{2}\right) \right) \quad (10)$$

$$R_{proposed}(d) = \frac{1}{2}\sum_{i=0}^{N_u-1} |y(d+i)|^2 \quad (11)$$

where d denotes the starting time instant when a received signal enters the detection window; y denotes the received signal as defined by the equation (2); G and Q denote the PN sequences as defined by the equation (3).

$M_{proposed}(d)$ as defined by the equation (9) represents the timing metric. $P_{proposed}(d)$ as defined by the equation (10) represents a metric of cross correlation for the received signal. $R_{proposed}(d)$ as defined by the equation (11) represents the half symbol energy of the received signal.

As can be seen from (10), introducing PN sequences as weighted factors ensures that the proposed timing metric achieves its maximum at the accurate timing point which is taken as the starting position of the useful part of the PRACH preamble, whereas the remaining values at the other sample points are fairly low compared to the correct position. Therefore, the impacts are small and could achieve smaller error rate of PRACH symbol timing at large frequency offset.

All samples over the PRACH period are utilized in calculation of the half symbol energy as shown in equation (11). $P_{proposed}(d)$ and $R_{proposed}(d)$ can be calculated iteratively. The goal that minimizes the correlation value between two partly related blocks and maximizes different pairs of product between two adjacent values is achieved by the proposed scheme. It is to be noted that the randomness of the PN sequence can be eliminated only at perfect timing position. When the long sequence is used, the length of the PN sequence used as a scrambling sequence becomes longer and thus the PN sequence is closer to the random signal. Then, the autocorrelation property of the PN sequence (e.g., m-sequence) becomes very sharp towards impulse shape, and the system performance could be improved correspondingly.

By means of exploiting the double correlation block windows which are spaced $N_u/4$ samples apart, the proposed timing metric as defined by the equations (9)-(11) appears impulse-shaped form sharply without large side lobes. When the double correlation block windows slide ahead, the same PN sequences including G and Q are introduced into the block, which can eliminate the PN randomness only when the accurate position of the PRACH timing offset is detected. In this way, the difference between the adjacent values of the timing metric function is further enlarged. This is dependent on the structure of the random access preamble, the property of the PN sequences and the design of the timing metric function. Computer simulations demonstrate that the proposed detection scheme has a significant probability of obtaining the accurate estimation of timing offset and relatively smaller error mean and SD as well as accurate detection rate compared with the other existing discussed estimators in NTN (will be detailed below).

Example Process

Figure 3:
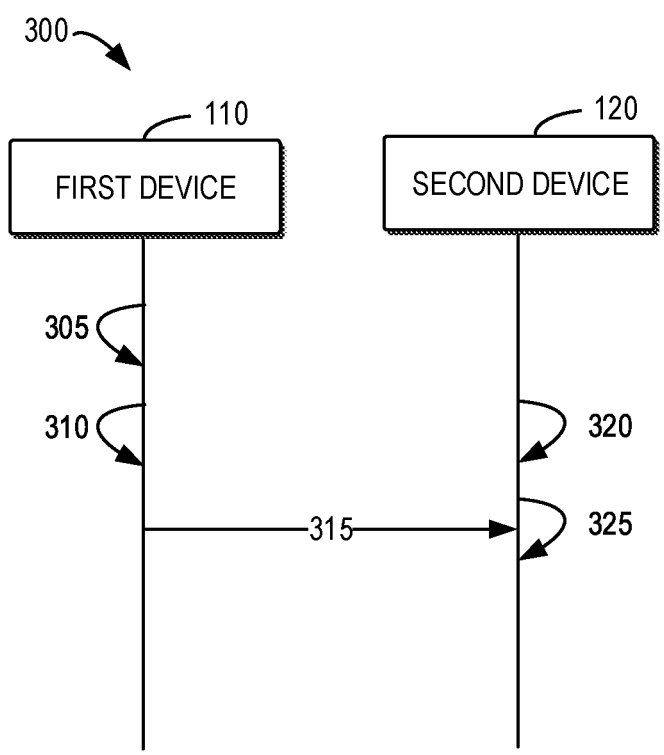
FIG. 3 illustrates a flowchart illustrating an example process for transmission of random access preamble according to some example embodiments of the present disclosure.

Some example embodiments regarding preamble design and corresponding detection scheme have been described above. Reference is now made to FIG. 3, which shows an example process 300 for transmission of a random access preamble according to some example embodiments of the present disclosure. For the purpose of discussion, the process 300 will be described with reference to FIG. 1. The process 300 may involve the first device 110 and the second device 120 as illustrated in FIG. 1.

In the process 300, the first device 110 determines 305 a base sequence, a first scrambling sequence for the base sequence, and a second scrambling sequence for the base sequence. For example, the first device 110 may generate the base sequence 210 as shown in FIG. 2A using the equation (6). Alternatively, the first device 110 may generate the base sequence 260 as shown in FIG. 2B using the equation (7). As mentioned above, the scrambling sequences may have a property of pseudo randomness.

In some example embodiments, to determine the base sequence, the first device 110 may determine a root sequence based on a format for the random access preamble. The root sequence may have a property of zero auto-correlation. The first device 110 may generate the base sequence based on the root sequence. The length of the root sequence is smaller than the length of the base sequence.

As an example, in the case where Format 4 is applicable, the first device 110 may first generate a ZC sequence $X_u$ using the equation (4) with $N_{ZC}$ of 839. Then, root sequence $x_u$ based on the generated ZC sequence is determined using the equation (5) with $N_u$ of $4 \cdot 32768 \kappa \cdot 2^{-\mu}$. It is to be noted that due to the characteristics of the AC sequence, the root sequence $x_u$ is also a ZC sequence.

In some example embodiments, the base sequence may be determined by simply repeating the root sequence for a plurality of times. In other word, the base sequence may comprise a plurality of repetitions of the root sequence. For example, the base sequence 260 generated using the equation (7) may comprise four repetitions of the root sequence $x_u$.

In some example embodiments, the base sequence may be determined by inverting the sign of the root sequence for a portion of the base sequence. In other words, the base sequence may comprise a plurality of repetitions of the root sequence with some of the plurality of repetitions with an inverted sign. In such example embodiments, the first device 110 may determine a first plurality of repetitions of the root sequence as a first portion of the base sequence, and determine a second plurality of repetitions of the root sequence with inverted sign as a second portion of the base sequence. The first portion and the second portion may be different. In one example embodiment, the number of the first plurality of repetitions is the same as the number of the second plurality of repetitions.

For the example shown in FIG. 2A, the two repetitions 201, 202 of the root sequence constitute the first portion, in particular, the first half of the base sequence 210. The two repetitions 203, 204 of the root sequence constitute the second portion, in particular, the latter half of the base sequence 210. As mentioned above, such a base sequence may be generated using the equation (6).

To generate the first and second scrambling sequences, the first device 110 may determine a first length of the first scrambling sequence and a second length of the second scrambling sequence based on a format for the random access preamble. Then, the first device 110 may generate the first scrambling sequence with the first length and generate the second scrambling sequence with the second length. In some example embodiments, each of the first and second lengths is a half of a length of the base sequence.

For example, the lengths of the first and second scrambling sequences may be determined based on the parameter $N_u$ of the preamble format. In the case where the Format 4 is applicable, the first and second scrambling sequences may have the same length of $N_u/2$. In the case where the scrambling sequences are based on PN sequences, the first and second scrambling sequences each with a length of $N_u/2$ may be generated using a sequence generator based on the shift register as described above. In the case where the scrambling sequences are based on another type of pseudo random sequence, the first and second scrambling sequences each with a length of $N_u/2$ may be generated using a corresponding sequence generator.

Still referring to FIG. 3, the first device 110 generates 310 the random access preamble by applying the first and second scrambling sequences to different portions of the base sequence, respectively. For example, the first and second scrambling sequences may be used as weighted factors for different portions of the base sequence. The first device 110 may generate or determine the random access preamble using the equation (8). Alternatively, the first and second scrambling sequences may be applied to portions of the base sequence, which have an overlap with each other.

The first device 110 transmits 315 the random access preamble to the second device 120. For example, the first device 110 may transmit 315 the random access preamble as Msg1 in a RA procedure.

To correctly receive the random access preamble, the second device 120 determines 320 the first and second scrambling sequences. The scrambling sequences used at the second device 120 may be the same as the scrambling sequences used at the first device 110. As such, the second device 120 may determine the first and second scrambling sequences in a similar manner as described above with respect to the first device 110. For example, the second device 120 may maintain a same sequence generator as that maintained at the first device 110. As an example, the second device 120 may generate the PN sequences G and Q defined by the equation (3).

The second device 120 then determines 325 a timing metric for estimating timing offset based on the first and second scrambling sequences. The timing metric may be determined based on the specific format of the random access preamble. The received signal may be divided into a plurality of portions or sections for example how the scrambling sequences are applied to the base sequence as required by the preamble format. The timing metric may be determined based on the signal received over the plurality of portions and the first and second scrambling sequences. For example, in the case where Format 4 is applicable, the received signal may be divided into two portions.

In some example embodiments, the second device 120 may determine a first cross correlation for a first portion of the received signal based on the first scrambling sequence and determine a second cross correlation for a second portion of the received signal based on the second scrambling sequence. Then, the timing metric may be determined based on the first cross correlation, the second cross correlation and energy of the received signal.

For the example timing metric shown in the equations (9)-(11), the item $$\sum_{i=0}^{\frac{N_u}{4}-1}\left(G_i G_{i+\frac{N_u}{4}} \cdot y^*(d+i) \cdot y\left(d+i+\frac{N_u}{4}\right)\right)$$

of the equation (10) represents the cross correlation for the first portion of the received signal y, which includes sampling points from d to $$\left(d+\frac{N_u}{2}-1\right);$$

the item $$\sum_{i=0}^{\frac{N_u}{4}-1}\left(Q_i Q_{i+\frac{N_u}{4}} \cdot y^*\left(d+i+\frac{N_u}{2}\right) \cdot y\left(d+i+\frac{N_u}{4}+\frac{N_u}{2}\right)\right)$$

of the equation (10) represents the cross correlation for the second portion of the received signal y, which includes sampling points from $$\left(d+\frac{N_u}{2}\right) \text{ to } (d+N_u-1).$$

Moreover, the energy of the received signal may be determined as the half symbol energy as defined by the equation (11).

To determine the first cross correlation, the first portion may be further divided into sub-portions or sub-sections for example based on the repetitious characteristics of the random access preamble. In some example embodiments, the first portion may be divided into first and second sub-portions. Each of sampling points in the first sub-portion corresponds to one of the sampling points in the second sub-portion. The first cross correlation may be determined based on the first scrambling sequence, the sampling points in the first sub-portion and the corresponding sampling points in the second sub-portion. In such example embodiments, the second cross correlation may be determined in a similar manner.

As mentioned above, the double correlation block windows which are spaced $N_u/4$ samples apart may be used. For the example cross correlation shown in the equation (10), the sampling points from $$d \text{ to } \left(d+\frac{N_u}{4}-1\right)$$

correspond to the sampling points in the first sub-portion or a first block; the sampling points from $$\left(d+\frac{N_u}{4}\right) \text{ to } \left(d+\frac{N_u}{2}-1\right)$$

correspond to the sampling points in the second sub-portion or a second block. The corresponding sampling points in the first and second blocks are spaced apart by $N_u/4$.

Still referring to FIG. 3, the second device 120 receives the random access preamble from the first device 110 based on the timing metric, for example the timing metric as defined by the equation (9). For example, as the signal is received, the second device 120 may calculate the value of the timing metric for each timing point d. The particular timing point d at which the timing metric achieves the maximum peak is considered as the starting point in time to demodulate the random access preamble.

Simulations have been conducted to evaluate the proposed timing offset estimator of the proposed PRACH preamble format. The results for the PRACH timing are shown in FIGS. 4A-4C, 5A-5C and 6.

In the simulation, the symbol length equals to 4 32768κ·$2^{-\mu}$, the CP length is 21024κ·$2^{-\mu}$, the subcarrier spacing (SCS) is 1.25·$2^\mu$ KHz and $\mu$=4. It is assumed that the timing offset and carrier frequency offset are $\theta$=1000 (about 32.56 us) and FO=48 kHz. Rayleigh channel models including flat-fading channel and frequency-selective channel are considered here. The performance is evaluated in terms of symbol timing error rate, error mean (EM) and standard deviation (SD). For symbol timing error rate, the absolute value of difference between estimated timing offset $\hat{\theta}$ and the setting value $\theta$ is defined as reference value $|\hat{\theta}-\theta|$. If $|\hat{\theta}-\theta|$=0, it means the estimated timing offset is precise and $\hat{\theta}$ is the unbiased estimation of $\theta$, which can be perceived as the right time to detect the starting point of the PRACH. Note that the error mean is the arithmetic average value of the error $|\hat{\theta}-\theta|$ and the standard deviation is the square root of the variance of $|\hat{\theta}-\theta|$ that used to measures the amount of variation or dispersion from the average.

Figure 4A:
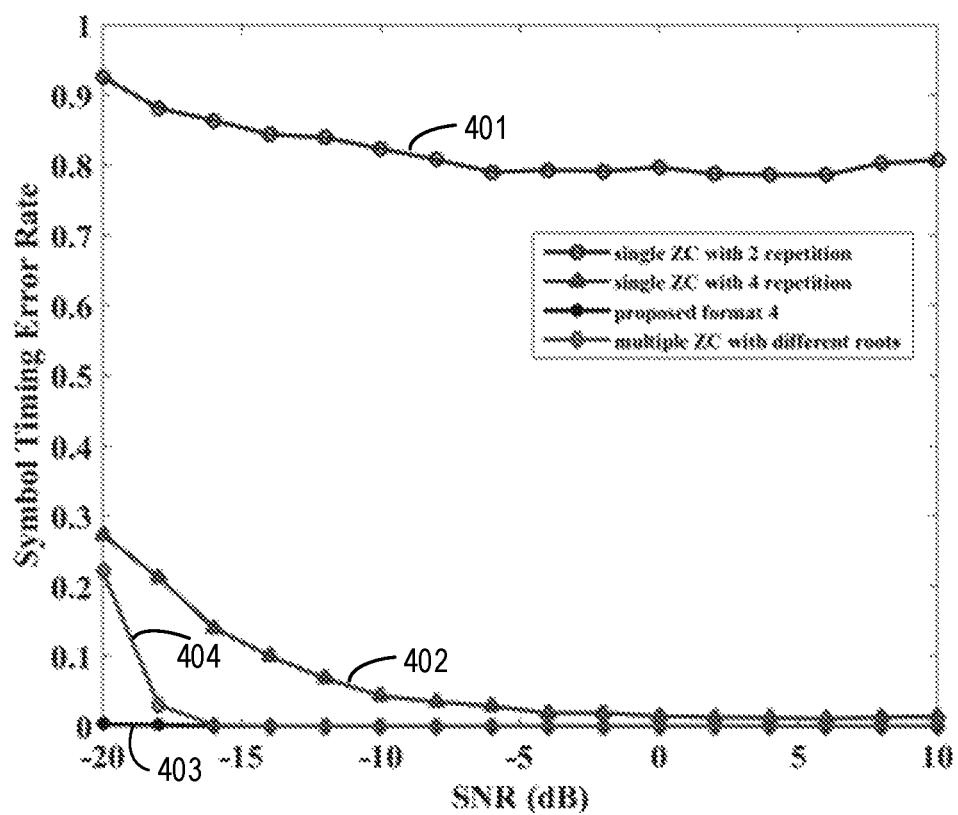
FIG. 4A illustrates simulation results of symbol timing error rate according to some example embodiments of the present disclosure.
Figure 4B:
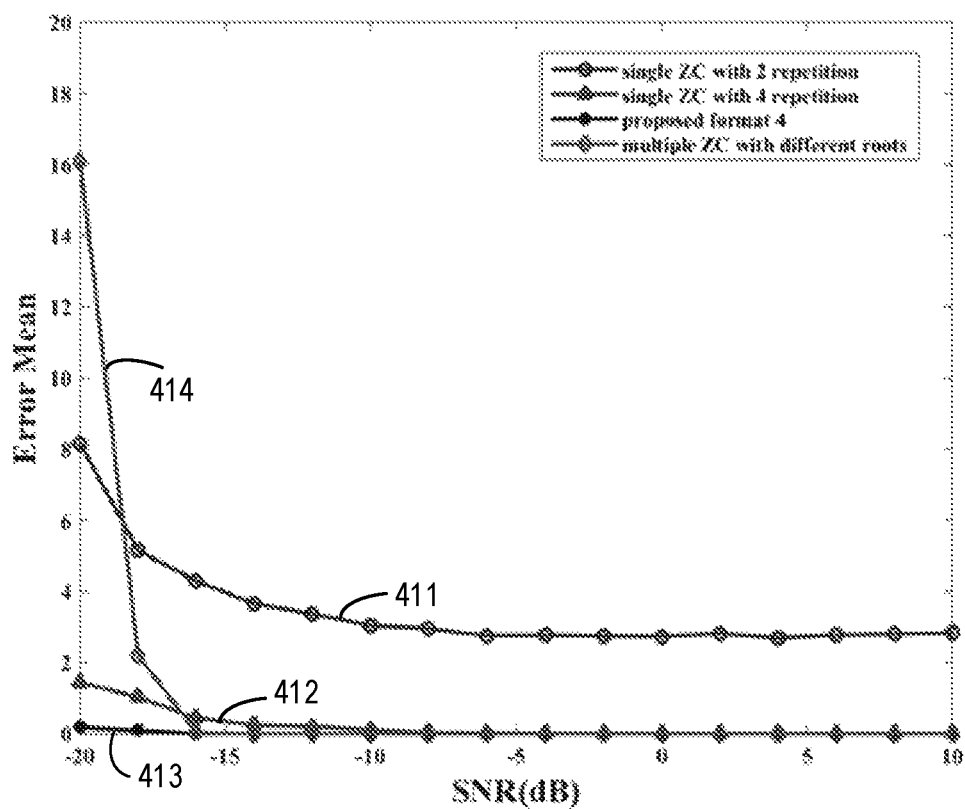
FIG. 4B illustrates simulation results of error mean of timing offset according to some example embodiments of the present disclosure.
Figure 4C:
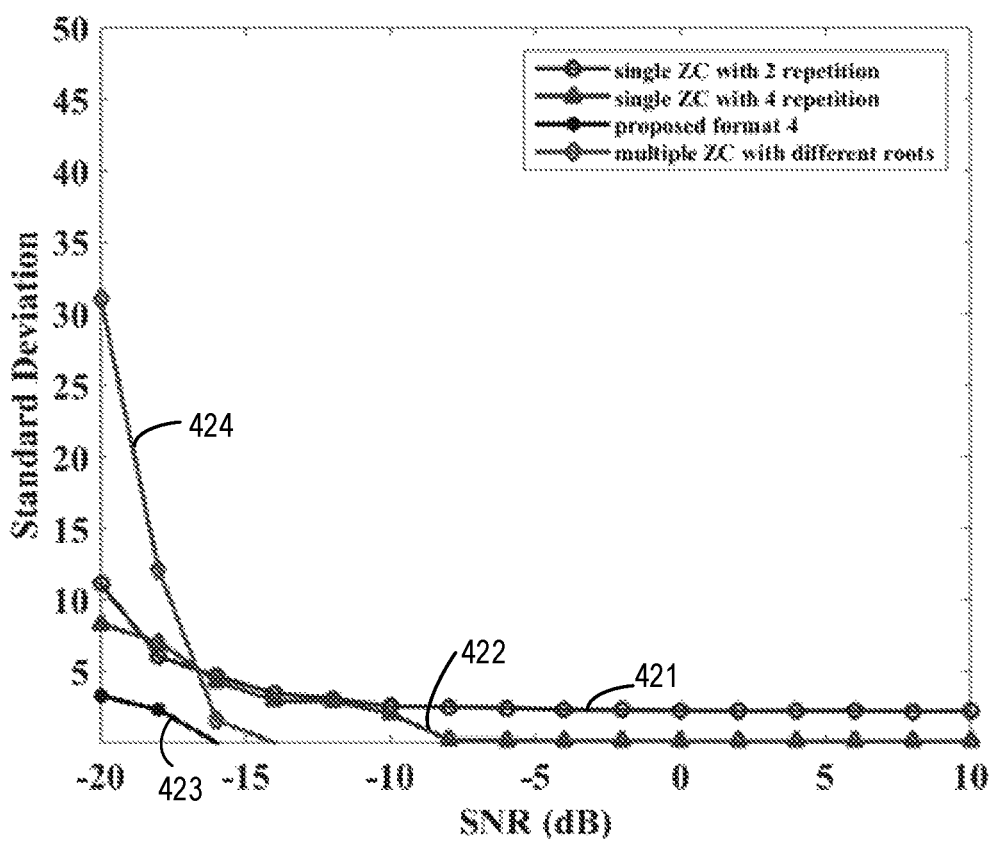
FIG. 4C illustrates simulation results of standard deviation of timing offset according to some example embodiments of the present disclosure.

FIGS. 4A-4C illustrate the simulation results for the long preamble 839 versus SNR under flat-fading channel with FO of 48 kHz at 2 GHz. FIG. 4A shows results for symbol timing error rate, with the curve 401 for single ZC sequence with 2 repetitions, the curve 402 for single ZC sequence with 4 repetitions, the curve 403 for the proposed Format 4 and the curve 404 for multiple ZC sequences with different roots. FIG. 4B shows results for error mean of $|\hat{\theta}-\theta|$, with the curve 411 for single ZC sequence with 2 repetitions, the curve 412 for single ZC sequence with 4 repetitions, the curve 413 for the proposed Format 4 and the curve 414 for multiple ZC sequences with different roots. FIG. 4C shows results for SD of $|\hat{\theta}-\theta|$, with the curve 421 for single ZC sequence with 2 repetitions, the curve 422 for single ZC sequence with 4 repetitions, the curve 423 for the proposed Format 4 and the curve 424 for multiple ZC sequences with different roots.

As seen in FIG. 4A, the proposed format performs better than other formats especially at a low SNR because the further reduction of the influence of the side-peak besides the correct position. The EM and SD performance is shown in FIGS. 4B and 4C, respectively. It shows that the performance of proposed format is the same as single ZC sequence with 4 repetitions and multiple ZC sequences with different roots when the SNR is greater than −12 dB but outperforms the others when SNR less than it.

Figure 5A:
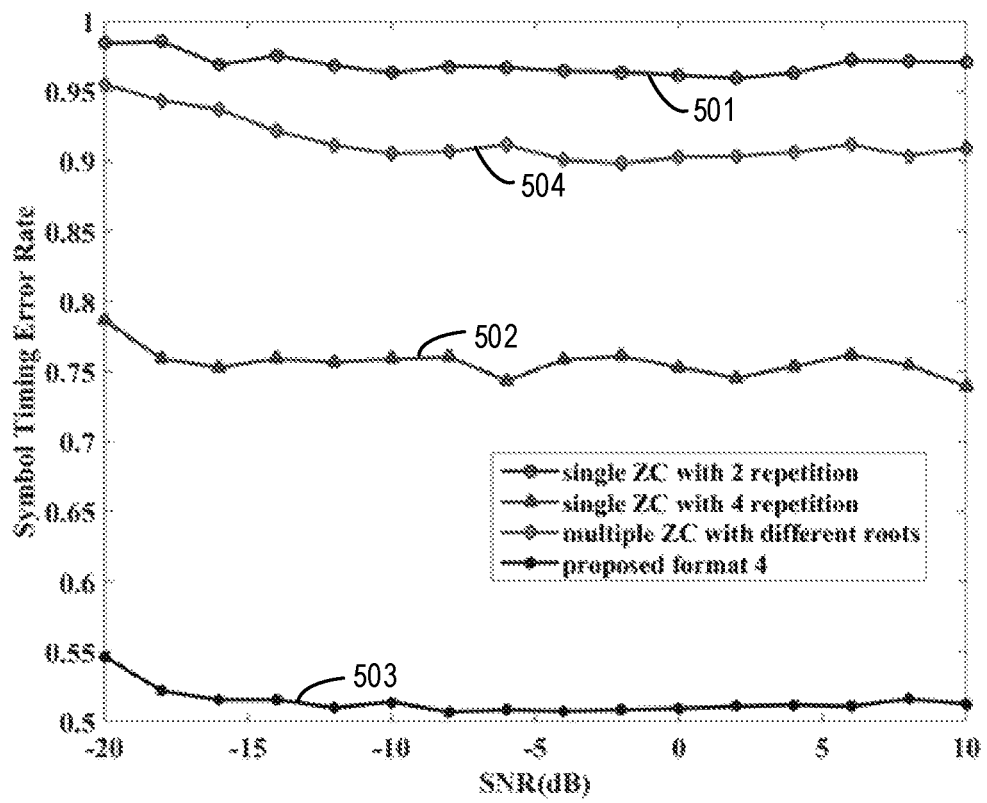
FIG. 5A illustrates simulation results of symbol timing error rate according to some example embodiments of the present disclosure.
Figure 5B:
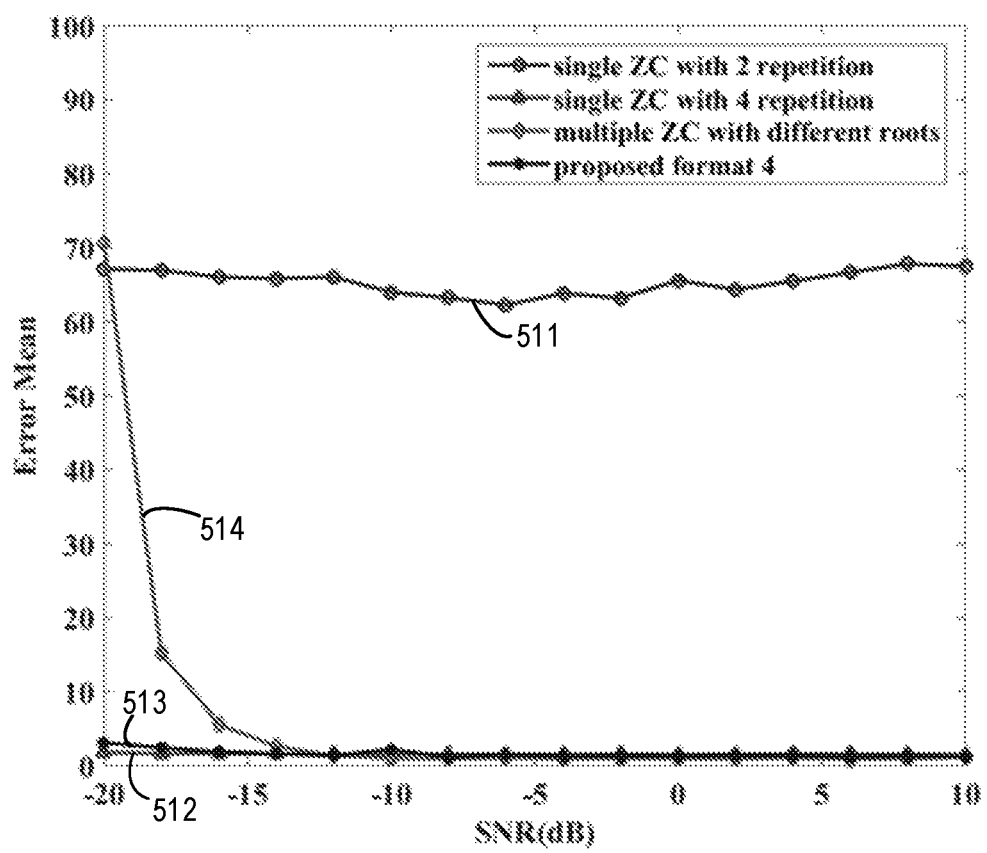
FIG. 5B illustrates simulation results of error mean of timing offset according to some example embodiments of the present disclosure.
Figure 5C:
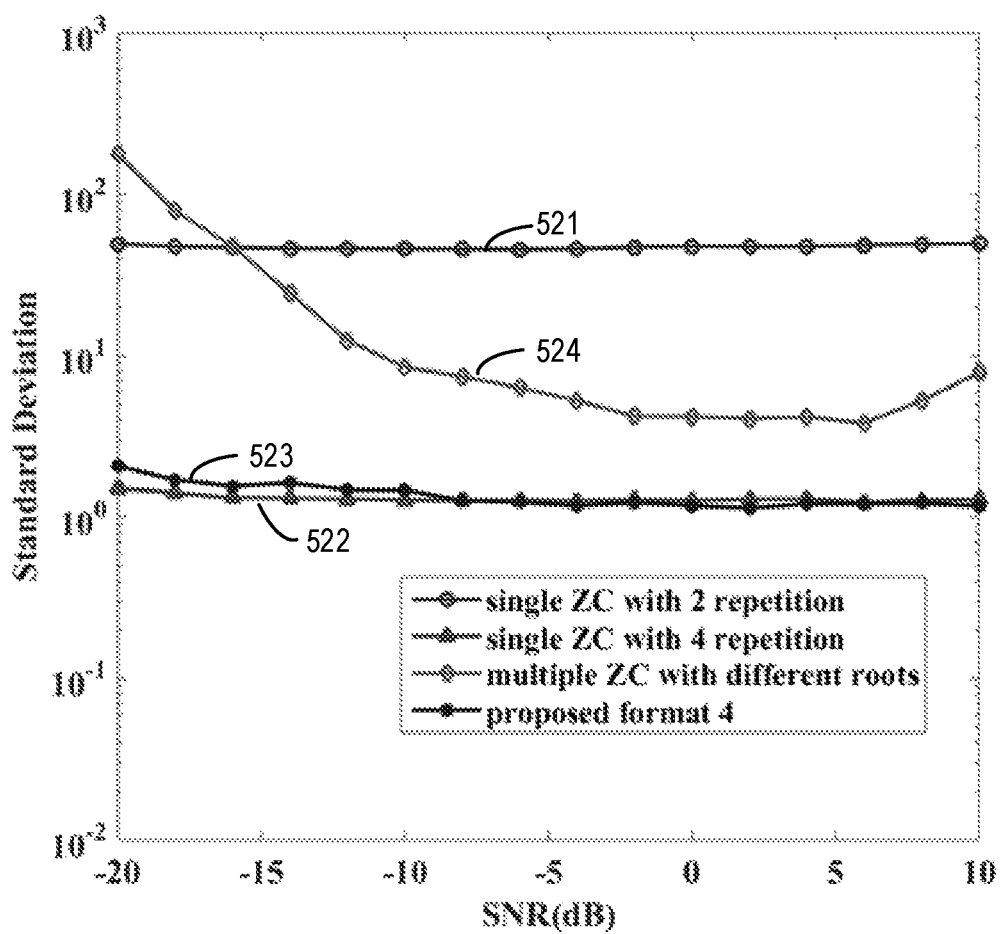
FIG. 5C illustrates simulation results of standard deviation of timing offset according to some example embodiments of the present disclosure.

FIGS. 5A-5C illustrate the simulation results for the long preamble 839 versus SNR under frequency-selective fading channels with FO of 48 kHz at 2 GHz. All the channels contain 6 Rayleigh-fading taps (L=5) with the exponential energy decay profile. Channel responses were produced by using of complex Gaussian random variable with zero mean and unit variance which satisfies that the power summation of each normalized path amplitude is equivalent to $\Sigma_l|h_l|^2$=1. FIG. 5A shows results for symbol timing error rate, with the curve 501 for single ZC sequence with 2 repetitions, the curve 502 for single ZC sequence with 4 repetitions, the curve 503 for the proposed Format 4 and the curve 504 for multiple ZC sequences with different roots. FIG. 5B shows results for error mean of $|\hat{\theta}-\theta|$, with the curve 511 for single ZC sequence with 2 repetitions, the curve 512 for single ZC sequence with 4 repetitions, the curve 513 for the proposed Format 4 and the curve 514 for multiple ZC sequences with different roots. FIG. 5C shows results for SD of $|\hat{\theta}-\theta|$, with the curve 521 for single ZC sequence with 2 repetitions, the curve 522 for single ZC sequence with 4 repetitions, the curve 523 for the proposed Format 4 and the curve 524 for multiple ZC sequences with different roots.

As illustrated in FIG. 5A, it can be seen that the proposed format still exhibits good performance in terms of the symbol timing error rate. In terms of EM and SD, the proposed format has similar performance with single ZC sequence with 4 repetitions but is superior to the rest formats as shown in FIG. 5B and FIG. 5C.

As mentioned above, through the proposed PRACH format and detection scheme, an accurate timing offset can be achieved to facilitate UL timing estimation in the presence of large UL frequency offset between the terminal device and the network device. Note that, even the max differential delay in LEO cannot be accommodated by the longest CP in the existing PRACH formats, multiple timing hypotheses could also be utilized to detect it with high complexity. The most important of the proposed solution is the ability to handle a large differential delay problem at a large Doppler shift in the PRACH receiver, for example the gNB.

Figure 6:
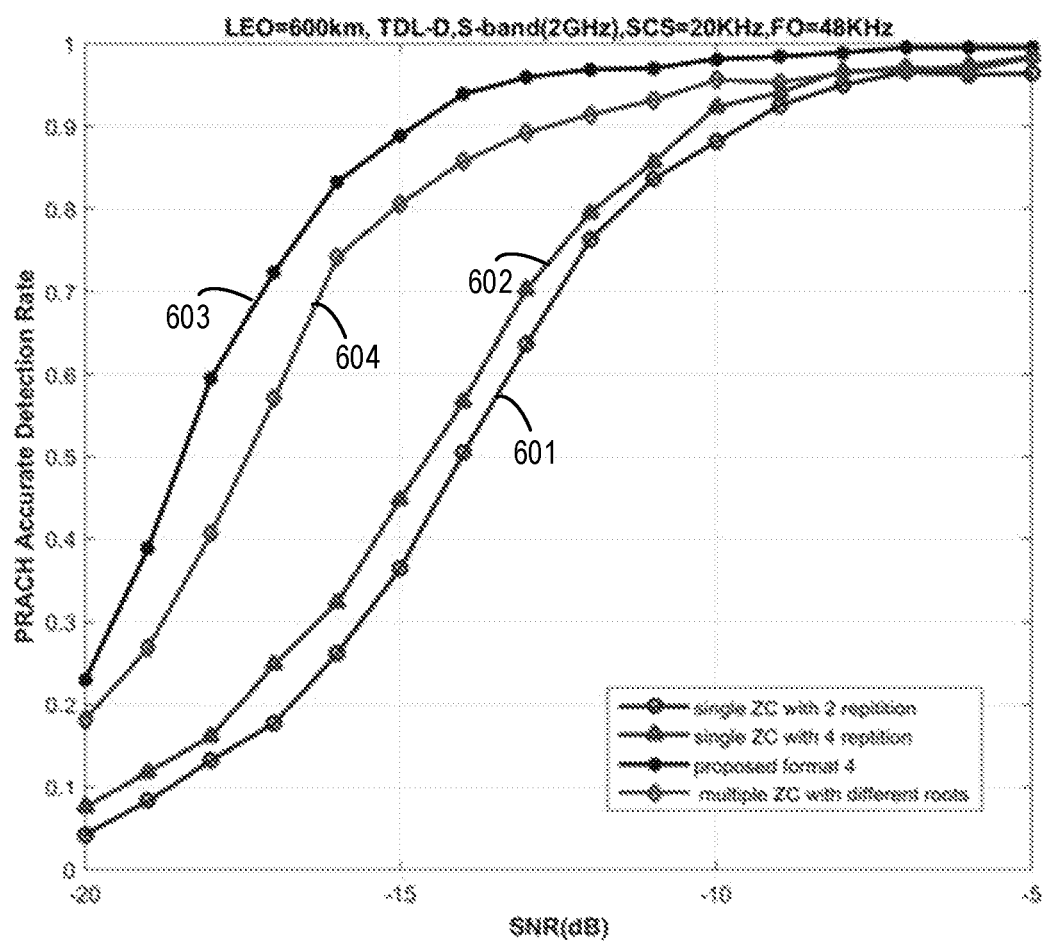
FIG. 6 illustrates simulation results of PRACH accurate detection rate according to some example embodiments of the present disclosure.

The PRACH detection rate is also evaluated. FIG. 6 illustrates the simulation results of the PRACH accurate detection rate for the proposed long preamble 839 Format 4 versus SNR with FO of 48 kHz at 2 GHz, with the curve 601 for single ZC sequence with 2 repetitions, the curve 602 for single ZC sequence with 4 repetitions, the curve 603 for the proposed Format 4 and the curve 604 for multiple ZC sequences with different roots. As can be seen from the FIG. 6, the receiving device (for example, a network device) is able to have 99% PRACH accurate detection rate at SNR point about −9 dB by using the proposed format 4, which is superior than the other existing formats in 3GPP discussion.

Table 3 shows the parameters for link-level PRACH simulations as used.

TABLE 3

| Link-level simulation assumptions for PRACH evaluation | |
|---|---|
| Satellite (network device) orbit | LEO-600 km |
| Satellite altitude | 600 km |
| Satellite position | (600 + 6371, 0, 0) km |
| network device velocity | 7558 m/s |
| Configurations | S-band |
| Carrier Frequency | DL: 2 GHz, UL: 2 GHz |
| Channel Model | CDL-D |
| satellite Antenna Pattern | 1 TX, 2 RX |

TABLE 3-continued

Link-level simulation assumptions for PRACH evaluation

| | |
|---|---|
| UE Antenna Pattern | (1, 1, 2) with omni-directional antenna element |
| Max. Frequency Offset (FOmax) | 48 KHz |
| Residual Frequency Offset (RO) | 8 KHz |
| Terminal device speed | 3 km/h |
| Initial timing Offset | STO < CP, the symbol timing offsets (STO >> CP) are not considered in this simulation and this problem could be handled using multiple timing hypotheses detection scheme |
| PRACH Formats | Long preambles 839: 1) single ZC with two repetition 2) single ZC with four repetitions 3) multiple ZC with two different roots 4) proposed PN weighted single ZC with 4 repetitions |
| PRACH power control | Ideal SNR in frequency domain at receiver per Rx antenna branch. |
| Number of terminal devices | 2 |
| Power offset of terminal devices | 3 dB SNR difference between the 2 terminal devices at the receiver of the network device |
| PRACH Detector | Non-coherent combination of in- and out-of phase Rx antenna branches. |
| PRACH number of available preamble sequences per beam | 64 |
| Performance Metric | Symbol timing error rate, EM, SD, PRACH accurate detection rate |

It is to be noted that the simulation results for the proposed format is particularly based on the example as shown in FIG. 2A. The simulation results for the random access preamble comprising simply 4 repetitions of ZC sequence as shown in FIG. 2B show a less good performance than that of FIG. 2A but a better performance than the other options.

In the present disclosure, a novel preamble-based symbol timing synchronizer has been presented for NTN to improve the timing precision. By taking advantage of the special properties of scrambling sequences (e.g., PN sequences), two different scrambling sequences with the same period as weighted factor may be used to design a new PRACH format. The corresponding novel PRACH detection scheme is also provided to ensure that the timing metric function has impulse-like shape at correct timing position.

The novel PRACH format and detection scheme is robust to large FO and show good property especially under low SNR assumption. The computer simulations show that the proposed solution achieves accurate timing offset estimation with smaller EM and SD as well as higher PRACH detection rate compared with the currently schemes in 3GPP NTN discussion. It is to be understood that although the proposed solution for enhanced PRACH preamble is discussed in terms of NTN scenario, the embodiments of the present disclosure are also applicable to the TN scenario.

More details of the example embodiments in accordance with the present disclosure will be described with reference to FIGS. 7-8.

Figure 7:
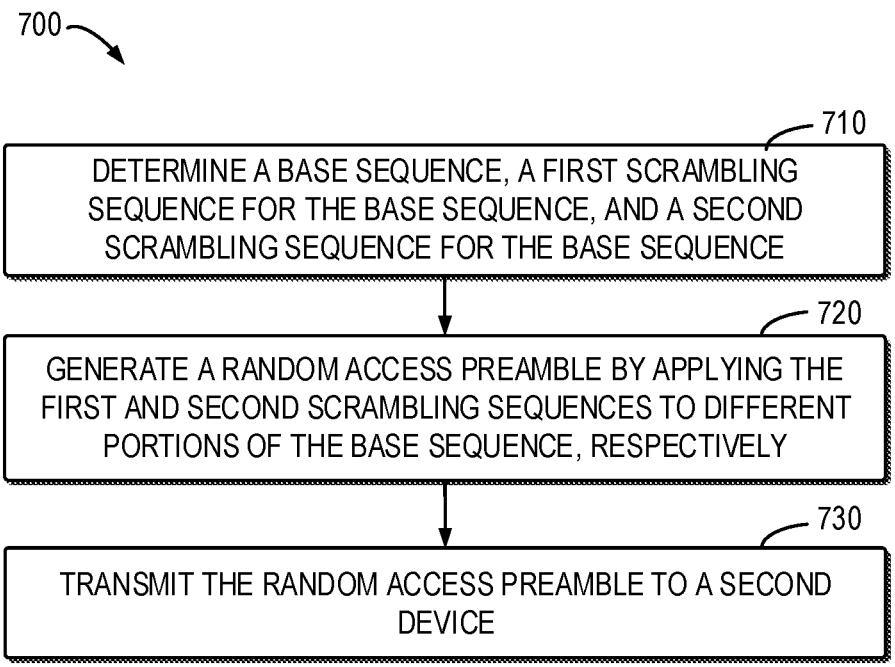
FIG. 7 illustrates a flowchart of a method according to some example embodiments of the present disclosure.

FIG. 7 shows a flowchart of an example method 700 according to some example embodiments of the present disclosure. The method 700 can be implemented at the first device 110 as shown in FIG. 1. For the purpose of discussion, the method 700 will be described with reference to FIG. 1.

At block 710, the first device 110 determines a base sequence, a first scrambling sequence for the base sequence, and a second scrambling sequence for the base sequence. At block 720, the first device 110 generates a random access preamble by applying the first and second scrambling sequences to different portions of the base sequence, respectively. At block 730, the first device 110 transmits the random access preamble to a second device 120.

In some example embodiments, determining the base sequence comprises: determining a root sequence based on a format for the random access preamble, the root sequence having a property of zero auto-correlation; and generating the base sequence based on the root sequence, a length of the root sequence being smaller than a length of the base sequence.

In some example embodiments, generating the base sequence based on the root sequence comprises: determining a first plurality of repetitions of the root sequence as a first portion of the base sequence; and determining a second plurality of repetitions of the root sequence with inverted sign as a second portion of the base sequence.

In some example embodiments, the number of the first plurality of repetitions is the same as the number of the second plurality of repetitions.

In some example embodiments, determining the first scrambling sequence and the second scrambling sequence comprises: determining a first length of the first scrambling sequence and a second length of the second scrambling sequence based on a format for the random access preamble; generating the first scrambling sequence with the first length; and generating the second scrambling sequence with the second length.

In some example embodiments, each of the first and second lengths is a half of a length of the base sequence.

In some example embodiments, the base sequence is based on a Zadoff-Chu sequence, and the first and second scrambling sequences are based on pseudo-noise sequences.

In some example embodiments, the first device 110 comprises a terminal device, and the second device 120 comprises a network device.

Figure 8:
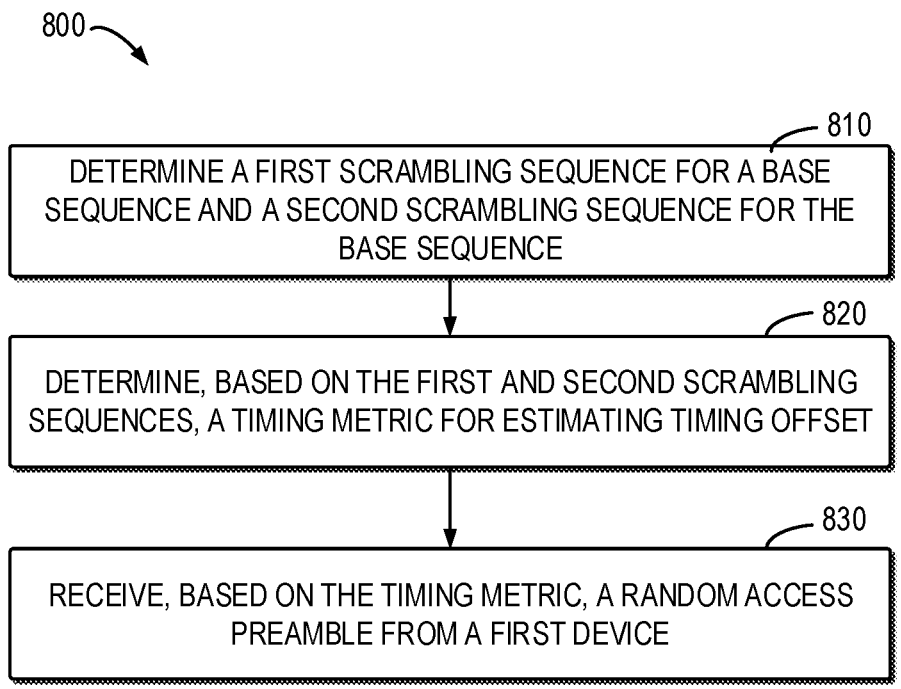
FIG. 8 illustrates a flowchart of a method according to some example embodiments of the present disclosure.

FIG. 8 shows a flowchart of an example method 800 according to some example embodiments of the present disclosure. The method 800 can be implemented at the second device 120 as shown in FIG. 1. For the purpose of discussion, the method 800 will be described with reference to FIG. 1.

At block 810, the second device 120 determines a first scrambling sequence for a base sequence and a second scrambling sequence for the base sequence. At block 820, the second device 120 determines, based on the first and second scrambling sequences, a timing metric for estimating timing offset. At block 830, the second device 120 receives, based on the timing metric, a random access preamble from a first device 110. The random access preamble generated by applying the first and second scrambling sequences to different portions of the base sequence, respectively.

In some example embodiments, determining the timing metric comprises determining a first cross correlation for a first portion of a received signal based on the first scrambling sequence; determining a second cross correlation for a second portion of the received signal based on the second scrambling sequence; and determining the timing metric based on the first cross correlation, the second cross correlation and energy of the received signal.

In some example embodiments, generating the base sequence based on the root sequence comprises: determining a first plurality of repetitions of the root sequence as a first portion of the base sequence; and determining a second plurality of repetitions of the root sequence with inverted sign as a second portion of the base sequence.

In some example embodiments, the number of the first plurality of repetitions is the same as the number of the second plurality of repetitions.

In some example embodiments, determining the first scrambling sequence and the second scrambling sequence comprises: determining a first length of the first scrambling sequence and a second length of the second scrambling sequence based on a format for the random access preamble; generating the first scrambling sequence with the first length; and generating the second scrambling sequence with the second length.

In some example embodiments, each of the first and second lengths is a half of a length of the base sequence.

In some example embodiments, the base sequence is based on a Zadoff-Chu sequence, and the first and second scrambling sequences are based on pseudo-noise sequences.

In some example embodiments, the first device 110 comprises a terminal device, and the second device 120 comprises a network device.

In some example embodiments, an apparatus capable of performing the method 700 may comprise means for performing the respective steps of the method 700. The means may be implemented in any suitable form. For example, the means may be implemented in a circuitry or software module.

In some example embodiments, the apparatus comprises means for determining, at a first device, a base sequence, a first scrambling sequence for the base sequence, and a second scrambling sequence for the base sequence; means for generating a random access preamble by applying the first and second scrambling sequences to different portions of the base sequence, respectively; and means for transmitting the random access preamble to a second device.

In some example embodiments, the means for determining the base sequence comprises: means for determining a root sequence based on a format for the random access preamble, the root sequence having a property of zero auto-correlation; and means for generating the base sequence based on the root sequence, a length of the root sequence being smaller than a length of the base sequence.

In some example embodiments, the means for generating the base sequence based on the root sequence comprises: means for determining a first plurality of repetitions of the root sequence as a first portion of the base sequence; and means for determining a second plurality of repetitions of the root sequence with inverted sign as a second portion of the base sequence.

In some example embodiments, the number of the first plurality of repetitions is the same as the number of the second plurality of repetitions.

In some example embodiments, the means for determining the first scrambling sequence and the second scrambling sequence comprises: means for determining a first length of the first scrambling sequence and a second length of the second scrambling sequence based on a format for the random access preamble; means for generating the first scrambling sequence with the first length; and means for generating the second scrambling sequence with the second length.

In some example embodiments, each of the first and second lengths is a half of a length of the base sequence.

In some example embodiments, the base sequence is based on a Zadoff-Chu sequence, and the first and second scrambling sequences are based on pseudo-noise sequences.

In some example embodiments, the first device comprises a terminal device, and the second device comprises a network device.

In some example embodiments, an apparatus capable of performing the method 800 may comprise means for performing the respective steps of the method 800. The means may be implemented in any suitable form. For example, the means may be implemented in a circuitry or software module.

In some example embodiments, the an apparatus comprises means for determining, at a second device, a first scrambling sequence for a base sequence and a second scrambling sequence for the base sequence; means for determining, based on the first and second scrambling sequences, a timing metric for estimating timing offset; and means for receiving, based on the timing metric, a random access preamble from a first device, the random access preamble generated by applying the first and second scrambling sequences to different portions of the base sequence, respectively.

In some example embodiments, the means for determining the timing metric comprises: means for determining a first cross correlation for a first portion of a received signal based on the first scrambling sequence; means for determining a second cross correlation for a second portion of the received signal based on the second scrambling sequence; and means for determining the timing metric based on the first cross correlation, the second cross correlation and energy of the received signal.

In some example embodiments, the means for generating the base sequence based on the root sequence comprises: means for determining a first plurality of repetitions of the root sequence as a first portion of the base sequence; and means for determining a second plurality of repetitions of the root sequence with inverted sign as a second portion of the base sequence.

In some example embodiments, the number of the first plurality of repetitions is the same as the number of the second plurality of repetitions.

In some example embodiments, the means for determining the first scrambling sequence and the second scrambling sequence comprises: means for determining a first length of the first scrambling sequence and a second length of the second scrambling sequence based on a format for the random access preamble; means for generating the first scrambling sequence with the first length; and means for generating the second scrambling sequence with the second length.

In some example embodiments, each of the first and second lengths is a half of a length of the base sequence.

In some example embodiments, the base sequence is based on a Zadoff-Chu sequence, and the first and second scrambling sequences are based on pseudo-noise sequences.

In some example embodiments, the first device comprises a terminal device, and the second device comprises a network device.

Figure 9:
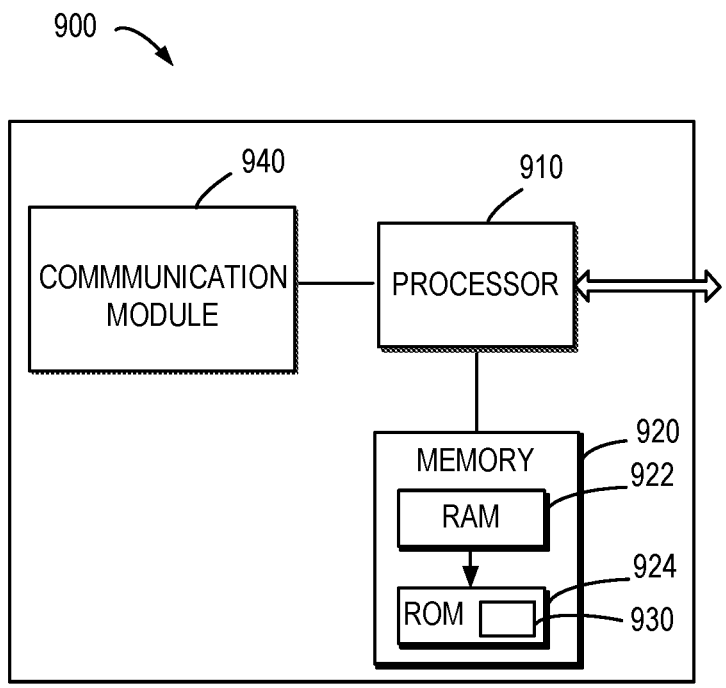
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement the communication device, for example the first device 110 or the second device 120 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 7 to 8. The embodiments of the present disclosure may also be implemented by hardware or by a combination of software and hardware.

Figure 10:
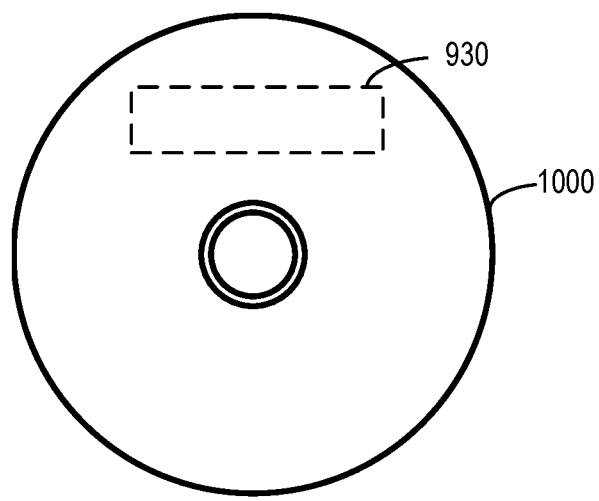
FIG. 10 illustrates a block diagram of an example computer readable medium in accordance with some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600, 700 or 800 as described above with reference to FIGS. 7-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one non-transitory memory including computer program codes;
where the at least one memory and the computer program codes are configured to, with the at least one processor, cause the first device at least to:
determine a base sequence, a first scrambling sequence for the base sequence, and a second scrambling sequence for the base sequence;
generate a random access preamble with applying the first and second scrambling sequences to different portions of the base sequence, respectively; and
transmit the random access preamble to a second device.

2. The first device of claim 1, wherein the at least one memory and the computer program codes are configured to, with the at least one processor, cause the first device to determine the base sequence with:
determining a root sequence based on a format for the random access preamble, the root sequence having a property of zero auto-correlation; and
generating the base sequence based on the root sequence, a length of the root sequence being smaller than a length of the base sequence.

3. The first device of claim 2, wherein generating the base sequence based on the root sequence comprises:
determining a first plurality of repetitions of the root sequence as a first portion of the base sequence; and
determining a second plurality of repetitions of the root sequence with inverted sign as a second portion of the base sequence.

4. The first device of claim 1, wherein the at least one memory and the computer program codes are configured to, with the at least one processor, cause the first device to determine the first scrambling sequence and the second scrambling sequence with:
determining a first length of the first scrambling sequence and a second length of the second scrambling sequence based on a format for the random access preamble;
generating the first scrambling sequence with the first length; and
generating the second scrambling sequence with the second length.

5. The first device of claim 4, wherein each of the first and second lengths is a half of a length of the base sequence.

6. The first device of claim 1, wherein the base sequence is based on a Zadoff-Chu sequence, and the first and second scrambling sequences are based on pseudo-noise sequences.

7. The first device of claim 1, wherein the first device comprises a terminal device, and the second device comprises a network device.

8. A second device comprising:
at least one processor; and
at least one non-transitory memory including computer program codes;
where the at least one memory and the computer program codes are configured to, with the at least one processor, cause the second device at least to:
determine a first scrambling sequence for a base sequence and a second scrambling sequence for the base sequence;
determine, based on the first and second scrambling sequences, a timing metric for estimating timing offset; and
receive, based on the timing metric, a random access preamble from a first device, the random access preamble generated with applying the first and second scrambling sequences to different portions of the base sequence, respectively.

9. The second device of claim 8, wherein the at least one memory and the computer program codes are configured to, with the at least one processor, cause the second device to determine the timing metric with:
determining a first cross correlation for a first portion of a received signal based on the first scrambling sequence;
determining a second cross correlation for a second portion of the received signal based on the second scrambling sequence; and
determining the timing metric based on the first cross correlation, the second cross correlation and energy of the received signal.

10. The second device of claim 9, wherein determining the first cross correlation comprises:
dividing the first portion into a first and second sub-portions, each of sampling points in the first sub-portion corresponding to one of sampling points in the second sub-portion; and
determining the first cross correlation based on the first scrambling sequence, the sampling points in the first sub-portion and the corresponding sampling points in the second sub-portion.

11. The second device of claim 8, wherein the at least one memory and the computer program codes are configured to, with the at least one processor, cause the second device to determine the first and second scrambling sequences with:
determining a first length of the first scrambling sequence and a second length of the second scrambling sequence based on a format for the random access preamble;
generating the first scrambling sequence with the first length; and
generating the second scrambling sequence with the second length.

12. The second device of claim 8, wherein the base sequence is based on a Zadoff-Chu sequence, and the first and second scrambling sequences are based on pseudo-noise sequences.

13. The second device of claim 8, wherein the first device comprises a terminal device, and the second device comprises a network device.

14. A method comprising:
    determining, at a first device, a base sequence, a first scrambling sequence for the base sequence, and a second scrambling sequence for the base sequence;
    generating a random access preamble with applying the first and second scrambling sequences to different portions of the base sequence, respectively; and
    transmitting the random access preamble to a second device.

15. The method of claim 14, wherein determining the base sequence comprises:
    determining a root sequence based on a format for the random access preamble, the root sequence having a property of zero auto-correlation; and
    generating the base sequence based on the root sequence, a length of the root sequence being smaller than a length of the base sequence.

16. The method of claim 15, wherein generating the base sequence based on the root sequence comprises:
    determining a first plurality of repetitions of the root sequence as a first portion of the base sequence; and
    determining a second plurality of repetitions of the root sequence with inverted sign as a second portion of the base sequence.

17. The method of claim 14, wherein determining the first scrambling sequence and the second scrambling sequence comprises:
    determining a first length of the first scrambling sequence and a second length of the second scrambling sequence based on a format for the random access preamble;
    generating the first scrambling sequence with the first length; and
    generating the second scrambling sequence with the second length.

18. The method of claim 17, wherein each of the first and second lengths is a half of a length of the base sequence.

19. The method of claim 14, wherein the base sequence is based on a Zadoff-Chu sequence, and the first and second scrambling sequences are based on pseudo-noise sequences.

20. A non-transitory computer readable medium comprising program instructions which when executed by a computer processor causes an apparatus to
    determine, at a first device, a base sequence, a first scrambling sequence for the base sequence, and a second scrambling sequence for the base sequence;
    generate a random access preamble with applying the first and second scrambling sequences to different portions of the base sequence, respectively; and
    transmit the random access preamble to a second device.

* * * * *